Aug. 23, 1966 R. GILMONT ET AL 3,268,203
PRESSURE STOPCOCK
Filed June 18, 1964
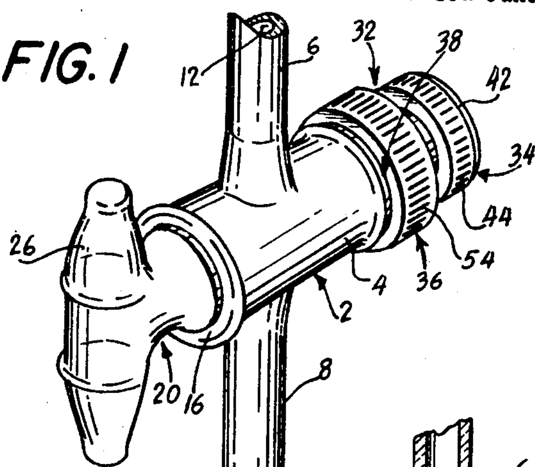
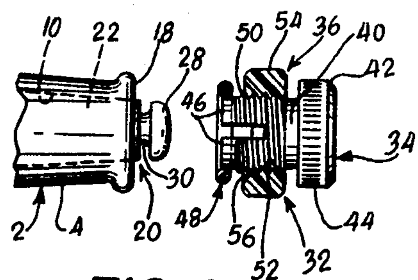
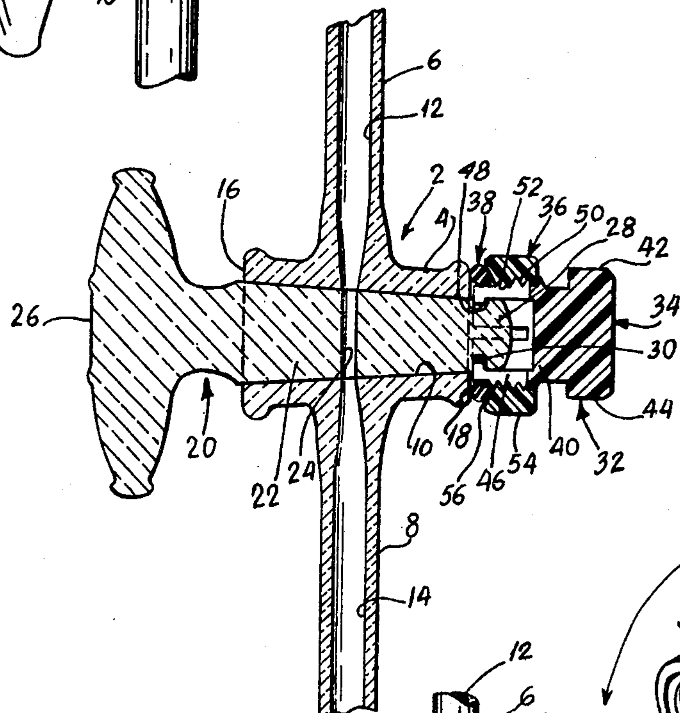
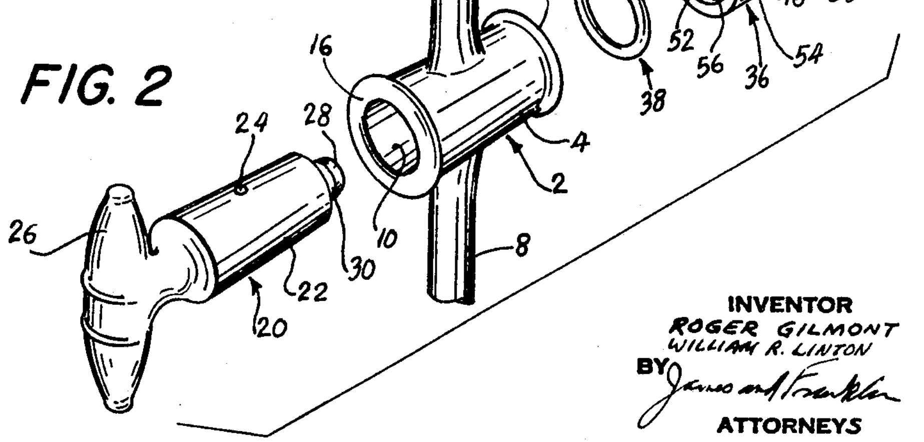
INVENTOR
ROGER GILMONT
WILLIAM R. LINTON
BY James and Franklin
ATTORNEYS

United States Patent Office 3,268,203

Patented August 23, 1966

1

3,268,203

PRESSURE STOPCOCK

Roger Gilmont, Douglaston, N.Y., and William R. Linton, Newfield, N.J., assignors to Kontes Glass Company, Vineland, N.J.

Filed June 18, 1964, Ser. No. 376,045
3 Claims. (Cl. 251—181)

The present invention relates to a pressure- or vacuum-tight stopcock, and particularly one of the type used in chemical laboratory equipment.

Stopcocks generally comprise a shell having a fluid passage therethrough, which passage is interrupted by a laterally extending bore which is usually tapered. A correspondingly tapered plug fits snugly within the bore and is rotatable therein, the plug having a passage which can be brought into registration with the passage through the shell when fluid is to flow through the stopcock and which may be moved out of registration with the shell passage when the flow of fluid through the stopcock is to be interrupted. Both the shell and the plug are usually made of glass, and the mating tapered surfaces of the shell bore and plug are designed to fit one another quite closely.

To make a stopcock of this type pressure- and vacuum-tight requires that the mating surfaces of the shell bore and plug sealingly engage one another, and this in turn requires that the plug be pressed into the bore with appreciable force. When this is done the mating glass surfaces tend to bind against one another and inhibit the ready rotatability of the plug between stopcock-opening and stopcock-closing positions. To retain the plug in place within the bore with just the right amount of force to accomplish a seal and at the same time permit the plug to be readily rotated is quite difficult, and often impossible. Accordingly a thin film of lubricant, such as petroleum jelly, is often interposed between the plug and the shell bore. This tends to prevent binding of the plug in the bore, but presents a problem of its own—if the plug is pulled into the bore too tightly the lubricant tends to be squeezed out from between the plug and the bore. This not only tends to prevent the lubricant from having its desired effect but also tends to contaminate the stopcock passage and make the stopcock unpleasant or messy to handle.

Various devices have been proposed in the past for controlling the force with which the plug is urged into the bore, but these constructions have in the main been characterized by complexity, cost and lack of long-term reliability in operation.

The prime object of the present invention is to devise a construction for a pressure stopcock in which the pulling of the plug into the shell bore with the proper amount of force is accomplished in a ready manner, and without requiring any undue degree of sensitivity in making manual adjustment of the device. A second prime object of the present invention is to devise such an assembly which is simple to assemble, which is made up of a minimal number of parts all of which have a high degree of reliability, which may be manufactured at a low cost, and which may be attached to and detached from the stopcock plug in a facile manner. Such detachability and attachability is desirable in order to permit the plug to be removed from the shell for cleaning purposes, and in order to permit use of a given stopcock either as a standard stopcock or as a pressure stopcock merely by removing or attaching the mechanism which pulls the plug into the bore.

These objectives are accomplished by causing an end of the plug to extend out beyond the shell of the stopcock, that plug end having a circumferential groove

2 therein. An externally threaded member is provided with axially extending arms between which the plug end is adapted to be received, those arms having parts adapted to snap into the plug groove. A nut is threadedly rotatably received on the member and is movable between a first position over the arms adjacent the groove-engaging parts thereof and a second position remote from the first position. When the nut is in its first position the arms are prevented from spreading and hence the arm-carrying member remains engaged with the plug groove. When the nut is in its second position the arms are permitted to spring apart, thereby permitting the member to be engaged with or disengaged from the plug groove. The end of the member remote from the arms is preferably provided with a laterally enlarged portion which prevents the nut from escaping from the member when it is moved to its second position, thus ensuring that the nut and member remain assembled together as a unit while the assembly is being used. An O-ring is compressed between the nut and the end of the shell beyond which the grooved plug end extends, that O-ring preferably also resiliently engaging the ends of the member arms.

All of the parts are simple, may be very inexpensively manufactured by conventional fabricating techniques, and are sturdy and reliable in operation.

To the accomplishment of the above, and to such other objects as may hereinafter appear, the present invention relates to the construction of a pressure stopcock, as defined in the appended claims, and as described in this specification, taken together with the accompanying drawings, in which:

FIG. 1 is a three-quarter perspective view of an embodiment of the present invention;

FIG. 2 is a three-quarter perspective exploded view thereof;

FIG. 3 is a vertical cross sectional view thereof; and

FIG. 4 is a detail view of the grooved end of the plug and the device adapted to be attached thereto in order to pull it into the shell bore with desired force.

The stopcock, as is conventional, comprises a shell generally designated 2 having a body portion 4 from which upper and lower tubes 6 and 8 extend, a laterally extending tapered bore 10 passing through the body 4, the ends of the passages 12 and 14 in the tube 6 and 8 respectively communicating with the bore 10. The bore 10 extends between end surfaces 16 and 18 of the body 4.

The plug, generally designated 20, comprises a body portion 22 received within the shell bore 10, matingly tapered relative thereto, and rotatable therein, that body portion 22 having a passage 24 which is rotatable between a vertical position shown in FIG. 3, in which it provides for communication between the passages 12 and 14, and a horizontal position in which communication between the passages 12 and 14 is cut off. A handle portion 26 extends out beyond the end surface 16 of the shell 2 so that the plug 20 may be rotated, and the plug 20 has an end portion 28 which extends out beyond the end surface 18 of the shell 2, and is there provided with a circumferential groove 30, which is also preferably outwardly spaced beyond the shell end surface 18. Both the shell 2 and the plug 20 may be formed of glass, and a layer of lubricant such as petroleum jelly (not specifically shown in the drawings) may be interposed between the circumferentially outer surface of the plug body portion 22 and the shell bore 10.

The assembly generally designated 32 is designed to engage and cooperate with the plug 20 in order to pull it into the bore 10 with sufficient force to produce an effective pressure- and vacuum-tight seal, while at the same time permitting ready rotation of the plug 20 within the shell 2 and preventing any undesired expulsion of lubricant from between the plug 20 and the shell 2. This assembly 32 comprises a plug-engaging member generally designated 34, a nut generally designated 36 which is threadedly received over the member 34, and an O-ring generally designated 38.

The member 34 comprises a body portion 40 having a laterally enlarged end 42 the outer surface 44 of which may be knurled for facilitating manipulation of the device. A plurality of arms 46 extend out axially from the body portion 40, the arms 46 being radially spaced so that the plug end 28 may be received between them. The arms, at their extremities, are provided with radially inwardly extending parts 48 which are adapted to be received within the plug groove 30. The outer surface of the arms 46 is externally threaded, at 50, those threads extending partway over the outer surface of the body portion 40 as here specifically disclosed. The laterally enlarged end 42 of the member 34 is appreciably spaced from the inner ends of the arms 46. The entire member 34 may be formed from some suitable structural material which will permit the arms 46 a degree of resilient bending so that the member 34 may be attached to or detached from the plug end 28 merely by forcing it in one direction or the other, the arms 46 spreading to permit their radially extending parts 48 to snap into or out from the plug groove 30. It has been found most convenient and economical to form the member 34 from a suitable synthetic plastic material such as high density polyethylene or polypropylene by suitable molding and machining operations.

The nut 36 may be formed of a material similar to that used for the member 34. Its inner surface is threaded at 52 so that it is threadedly received on the threaded portion 50 of the member 34 and is movable between a first or forward position over the legs 46 (see FIG. 3) and a second or rearward position close to the laterally enlarged end 42 of the member 34. FIG. 4 shows the nut 36 in an intermediate position. In the first of these positions the nut 36 prevents the arms 46 from spreading apart and thus retains the member 34 in position engaged with the plug groove 30. In the second position the arms 46 extend out beyond the nut 36 and are therefore permitted to spread apart so that the member 34 can be engaged with or disengaged from the plug end 28. The outer surface 54 of the nut 36 may be knurled in order to facilitate the manipulation thereof. Since the laterally enlarged member end 42 is larger than the bore of the nut 36, the end 42 constitutes a stop for the nut 36 when the latter is moved to its second or arm-releasing position, thus facilitating retention of the nut 36 on the member 34 and the manipulation of the two as a single unit.

When the nut 36 is moved to the left to its position encompassing the arms 46 it is also directed toward and into operative engagement with the end surface 18 of the shell body 4, and the force which it exerts against the shell surface 18 is transmitted to the plug 20 by the member 34, thereby pulling the plug 20 into the shell bore 10 with a corresponding force.

Direct operative engagement between the nut 36 and the shell surface 18 is possible, but with such direct engagement a slight rotative adjustment of the nut 36 will result in a very substantial change in the force pulling the plug 20 into the bore 10. This sensitivity of adjustment is undesirable. Accordingly, the O-ring 38 is interposed between the shell surface 18 and the left hand end of the nut 36, that nut end preferably being provided with a counterbore, at 56, within which the O-ring 38 is adapted to seat. When the O-ring 38 is thus compressed between the left hand end of the nut 36 and the shell surface 18, rotation of the nut 36 on the member 34 will produce a variation in the force with which the plug 20 is pulled into the shell bore 10 with considerably less criticality, so that proper adjustment may easily be made to produce a pressure- and vacuum-tight seal between the plug body 22 and the shell bore 10 without binding and without unduly squeezing lubricant from between those two elements.

When, as is preferred, the plug groove 30 is somewhat outwardly spaced from the shell surface 18, and when, as is preferred, the O-ring 38, when it is compressed by the nut 36, is also compressed radially inwardly toward and into engagement with the tips of the arms 46, the O-ring 38 not only functions to assist the nut 36 in keeping the arms 46 engaged with the groove 30, but also acts to wedge itself between the tips of the arms 46 and the shell surface 18, thereby assisting in forcing the member 34 to the right as shown in FIG. 3, and thus pulling the plug 20 into the shell bore 10.

In use, the nut 36 is screwed to the right on the member 34 substantially to the position shown in FIG. 4. The plug 20 is inserted into the bore 10 so that its end 28 extends out beyond the shell surface 18. The O-ring may be put in place directly on the plug end 28 or, if desired, it may be mounted on the tips of the arms 46, as shown in FIG. 4. In the latter arrangement the O-ring 38 has sufficient resiliency to permit the arms 46 to spread, and that arrangement has the advantage that all of the parts of the mechanism designed to produce pressure-stopcock operation may be handled as a single unit. The member 34 with the nut 36 thereon (and with the O-ring 38 thereon if desired) is then pushed axially onto the end 28 of the plug 20, the parts 48 carried by the arms 46 snapping into the plug groove 30. The enlarged end 42 of the member 34 is grasped with one hand to prevent rotation thereof and the nut 36 is rotated with the other hand to the position shown in FIG. 3, that rotation of the nut 36 being continued until the desired degree of axial pull is exerted on the plug 20. When the plug 20 is to be removed from the shell 2 the sequence of operations is reversed.

Thus, with the use of three simple parts which may be easily and inexpensively fabricated through conventional manufacturing techniques, and which need not be made to any precise tolerances, close control is achieved over the force with which the plug 20 and shell 2 engage one another, the arrangement being readily adjustable from time to time as necessary so as to compensate for any changes or variations in the dimensional or force-producing characteristics of the various parts.

While but a single embodiment of the present invention has been here specifically disclosed, it will be apparent that many variations may be made therein, all within the scope of the instant invention as defined in the following claims.

We claim:

1. In combination with a stopcock comprising a shell having a bore and a plug rotatably received in said bore with an end of said plug extending out beyond said shell and having a circumferential groove therein, a member having a body and arms extending axially therefrom, means active on said arms and resiliently resisting spreading thereof, said plug end being received between said arms and said arms having parts snap engaging in said plug groove, said member being externally threaded at least along said arms and having a laterally enlarged portion at its end opposite to said arms, a nut threadedly rotatably received on said member and movable between a first position over said arms adjacent said groove-engaging parts and a second position remote from said first position, thereby respectively preventing or permitting said arms to spread and become disengaged from said plug groove, said nut being passable over the arms-end of said member but being blocked from passage over the body-end of said member by said laterally enlarged portion, and means operative between said shell and said nut for urging said plug axially into said bore.

2. In combination with a stopcock comprising a shell having a bore and a plug rotatably received in said bore with an end of said plug extending out beyond a wall of said shell and having a circumferential groove therein, a member having a body and arms extending axially therefrom and terminating in ends, said plug end being received between said arms and said arms having parts engaging in said plug groove, said member being externally threaded at least along said arms, a nut threadedly rotatably received on said member and movable between a first position over said arms adjacent said groove-engaging parts and a second position remote from said first position, thereby respectively preventing or permitting said arms to spread and become disengaged from said plug groove, and an O-ring mounted on and carried by said arms at said ends thereof simultaneously engaging and compressed between said nut, said member arms and said shell wall, said O-ring being active on said arms to urge them inwardly toward said plug end.

3. In combination with a stopcock comprising a shell having a bore and a plug rotatably received in said bore with an end of said plug extending out beyond a wall of said shell and having a circumferential groove therein, a member having a body and arms extending axially therefrom, said plug end being received between said arms and said arms having parts engaging in said plug groove, said member being externally threaded at least along said arms and having a laterally enlarged portion at its end opposite to said arms, a nut threadedly rotatably received on said member and movable between a first position over said arms adjacent said groove-engaging parts and a second position remote from said first position, thereby respectively preventing or permitting said arms to spread and become disengaged from said plug groove, said nut being passable over the arms-end of said member but being blocked from passage over the body-end of said member by said laterally enlarged portion, and an O-ring simultaneously engaging and compressed between said nut, said member arms and said shell wall, said O-ring being active on said arms to urge them inwardly toward said plug end.

References Cited by the Examiner

UNITED STATES PATENTS

| | | | |
|---|---|---|---|
| 2,412,597 | 12/1946 | Brewer ------------ | 251—181 |
| 2,642,258 | 6/1953 | Stone ------------- | 251—181 |
| 2,741,452 | 4/1956 | Benjamin ---------- | 251—192 |
| 2,876,985 | 3/1959 | Birchall ----------- | 251—192 |
| 3,142,474 | 7/1964 | Nelson ------------ | 251—309 |

FOREIGN PATENTS

| | | |
|---|---|---|
| 1,014,808 | 8/1957 | Germany. |

WILLIAM F. O'DEA, *Primary Examiner.*

ISADOR WEIL, *Examiner.*

H. WEAKLEY, *Assistant Examiner.*